(12) United States Patent
Aulet

(10) Patent No.: US 7,913,741 B1
(45) Date of Patent: Mar. 29, 2011

(54) SCREEN CONNECTION PASS-THROUGH FOR HOSES, ELECTRIC/POWER CORDS, TELEPHONE AND CABLE LINES

(76) Inventor: Jose M. Aulet, Saint Cloud, FL (US)

( * ) Notice: Subject to any disclaimer, the term of this patent is extended or adjusted under 35 U.S.C. 154(b) by 451 days.

(21) Appl. No.: 12/055,576

(22) Filed: Mar. 26, 2008

(51) Int. Cl.
*E06B 7/28* (2006.01)
(52) U.S. Cl. .......................... 160/180; 160/237
(58) Field of Classification Search ............ 160/44, 160/127, 237, 180, 369; 52/209, 204.52, 52/302.7
See application file for complete search history.

(56) References Cited

U.S. PATENT DOCUMENTS

| | | | | |
|---|---|---|---|---|
| 1,780,823 | A | * | 11/1930 | Johnson .................. 160/103 |
| 2,854,072 | A | * | 9/1958 | Winnan .................. 160/180 |
| 3,017,203 | A | * | 1/1962 | Macleod ................. 285/256 |
| 3,895,466 | A | | 7/1975 | Melton |
| 4,044,813 | A | * | 8/1977 | Emmons .................. 160/369 |
| 4,146,058 | A | * | 3/1979 | Bercovitz ................ 138/96 R |
| 4,216,558 | A | * | 8/1980 | Schultz .................. 114/343 |
| 4,236,736 | A | * | 12/1980 | Anderson ............... 285/125.1 |
| 4,274,469 | A | * | 6/1981 | Kuyper et al. ............ 160/107 |
| 4,330,022 | A | * | 5/1982 | Bull et al. ............... 160/379 |
| 4,334,461 | A | | 6/1982 | Ferguson et al. |
| 4,800,916 | A | * | 1/1989 | Lakey .................... 137/343 |
| 4,967,524 | A | | 11/1990 | Hull et al. |
| 6,038,992 | A | * | 3/2000 | Smith .................... 114/183 R |
| D465,276 | S | | 11/2002 | Snyder |
| 6,634,407 | B1 | | 10/2003 | Strohmeyer |
| D507,344 | S | | 7/2005 | Anderson |
| 6,998,530 | B2 | | 2/2006 | Snyder |
| 7,159,360 | B2 | | 1/2007 | Platts |
| 2005/0001107 | A1 | | 1/2005 | Costas |
| 2005/0028750 | A1 | | 2/2005 | Johnston |
| 2006/0213132 | A1 | | 9/2006 | Bonshor |

* cited by examiner

*Primary Examiner* — David Purol
(74) *Attorney, Agent, or Firm* — Brian S. Steinberger; Law Offices of Brian S. Steinberger, P.A.

(57) ABSTRACT

Devices, apparatus, systems and methods for providing a pass through connection opening for water hoses, electrical and power cords, telephone lines, and cable lines to freely pass through screens such as screen pool enclosures, screen doors, and the like. The pass-through connectors easily attach to the screens to allow for a permanent pass through to exist between an interior space and an exterior space that is separated by a screen wall. The connectors can have a first plate with central opening and corner adjacent male protruding members with enlarged heads, and a second plate with central opening and corner adjacent female openings in similar locations. The plates can be positioned on opposite sides of the screen wall so that their respective fastening portions and their central openings are aligned to another. The plates can then be snapped together by the male members being received within each of the female openings. An opening in the screen wall can be formed through the aligned central openings of the plates, and garden hose or electrical conduit can pass through. The central plate openings can have reduced diameters by a ringed grommet. Also, a connector having a threaded end can be locked in place in the openings with a nut.

20 Claims, 15 Drawing Sheets

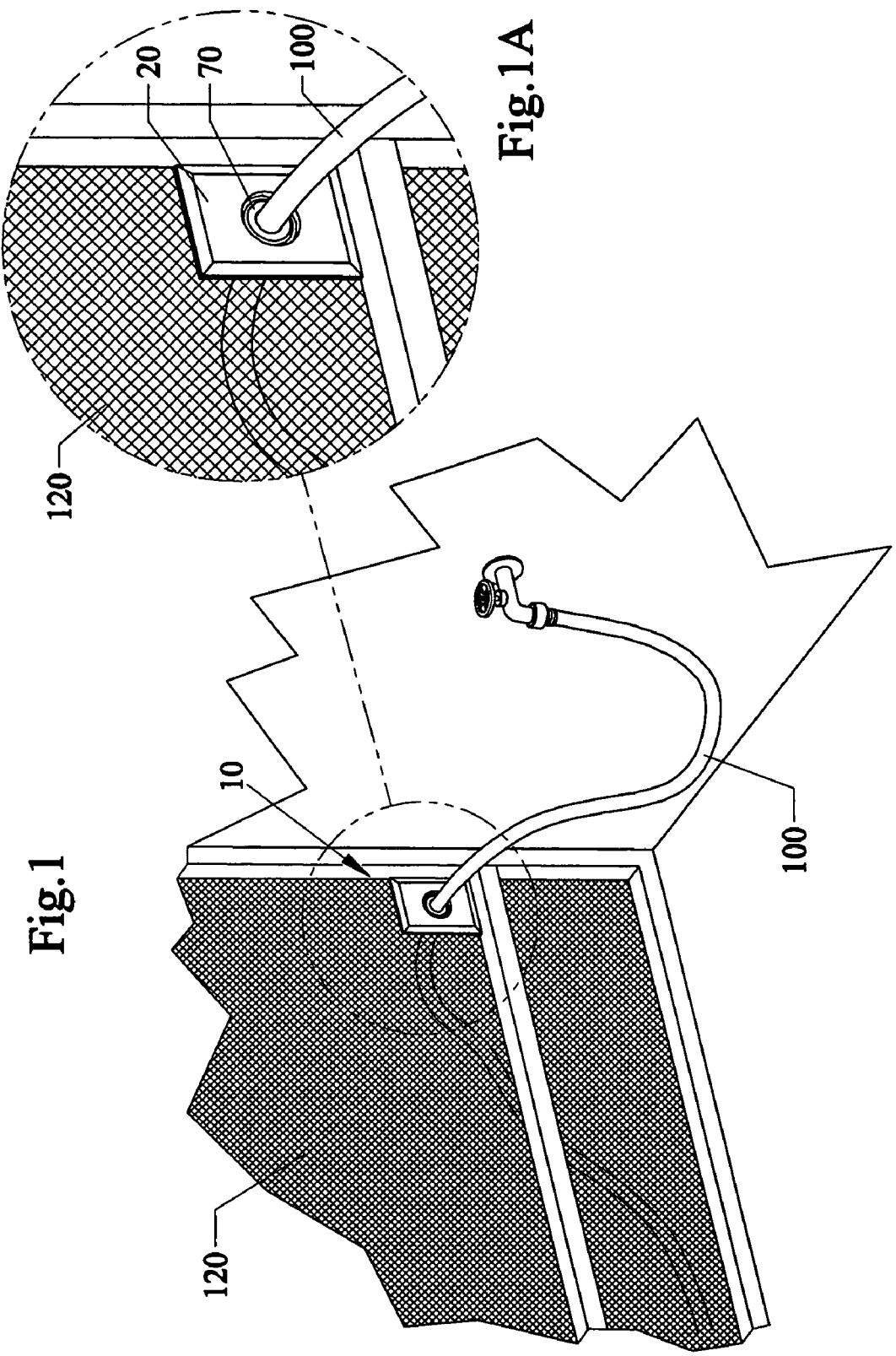

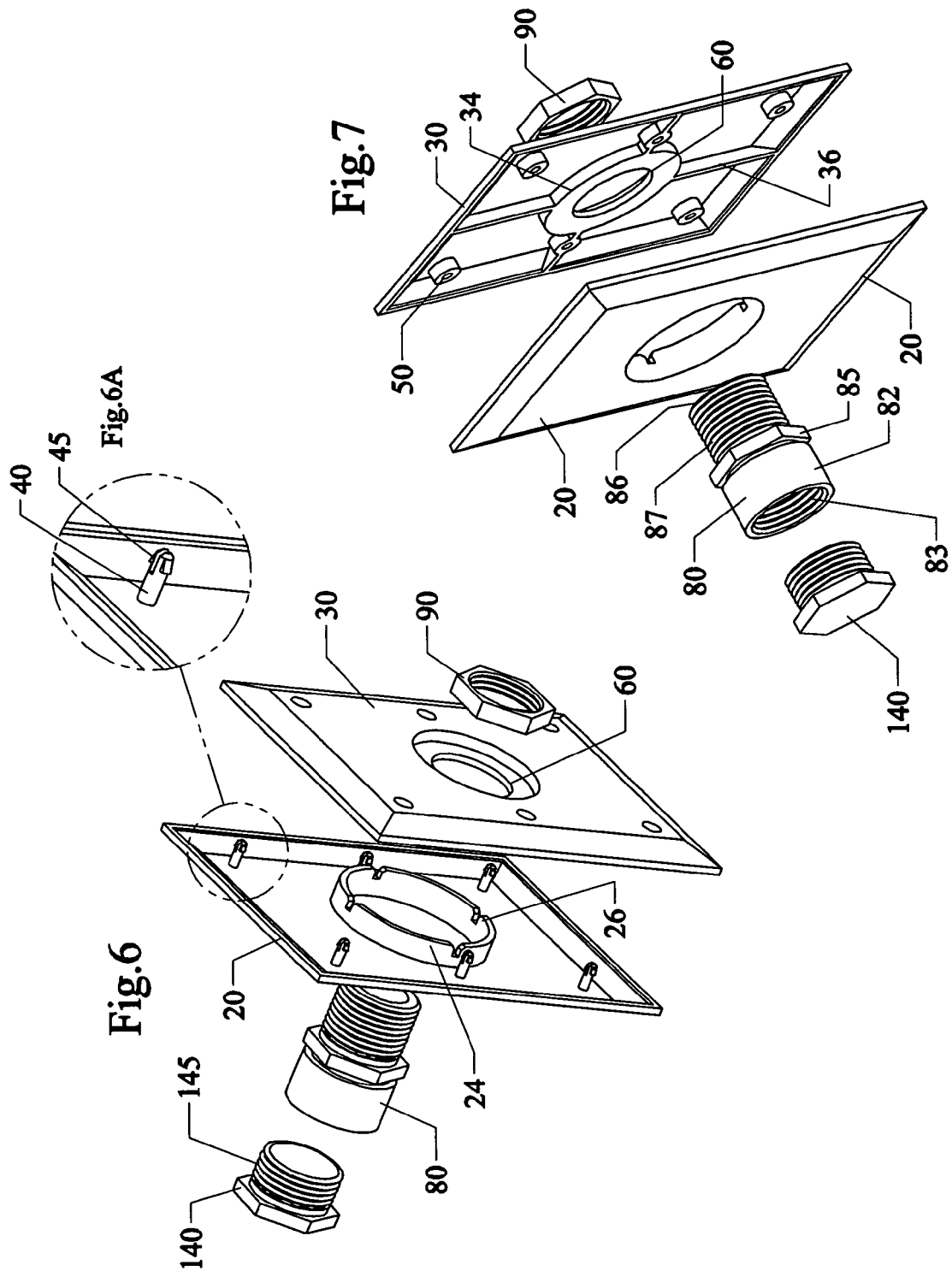

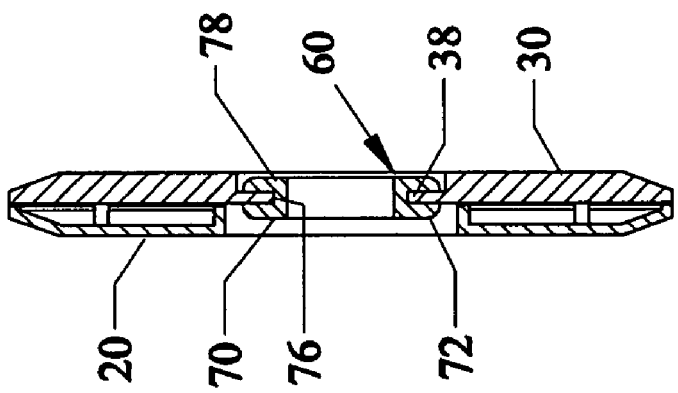
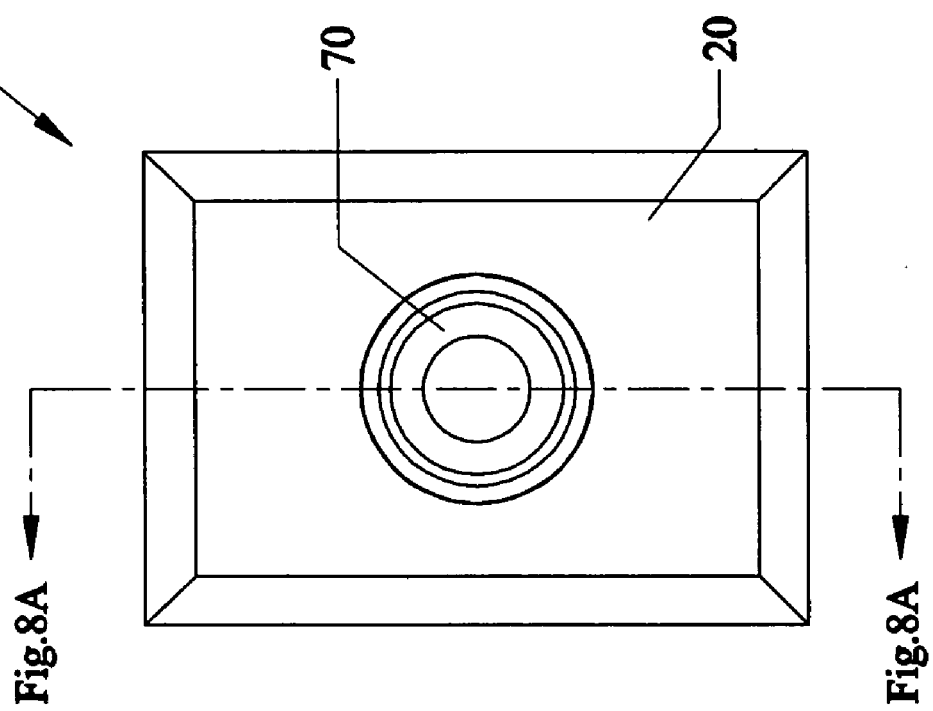

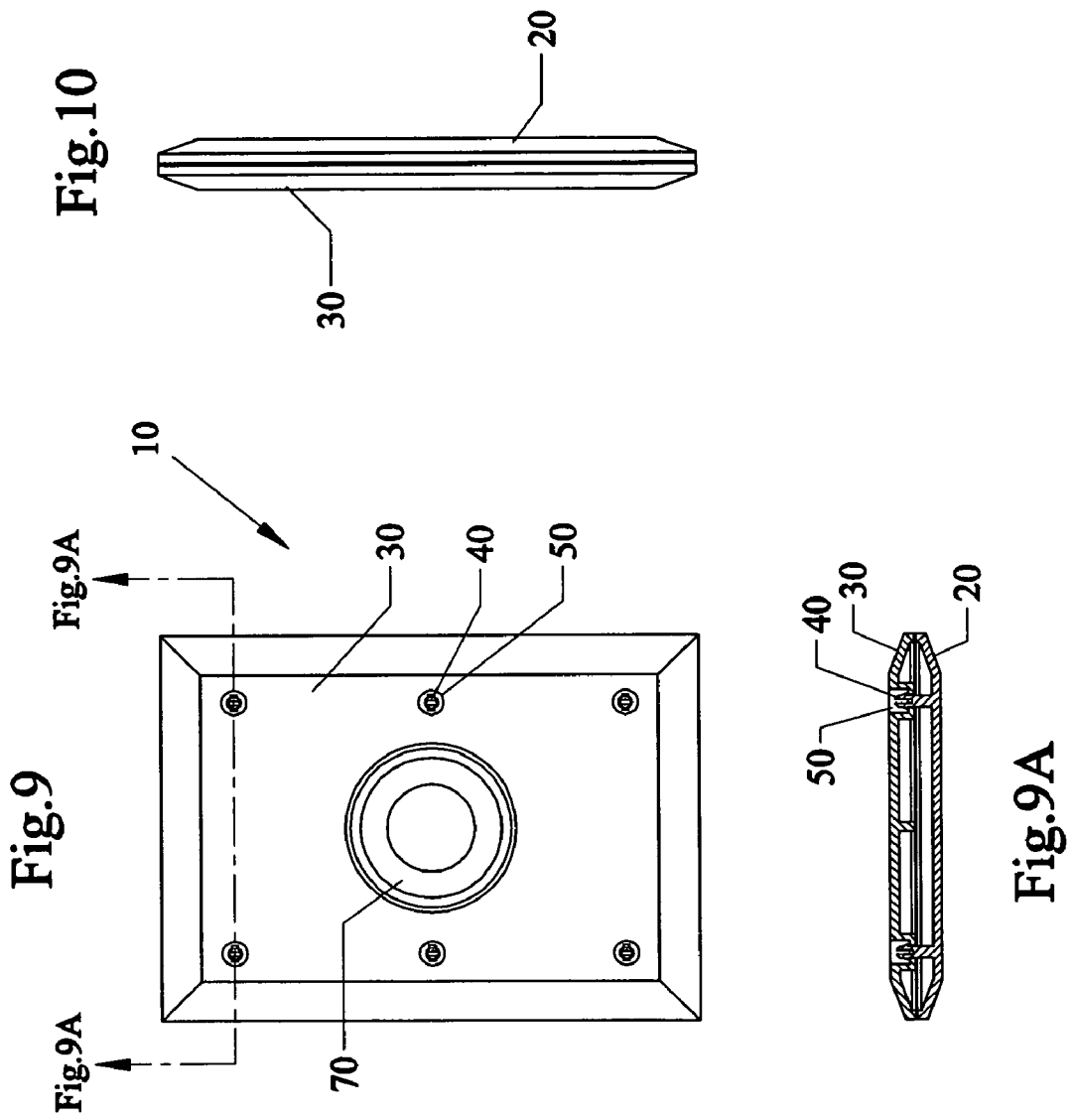

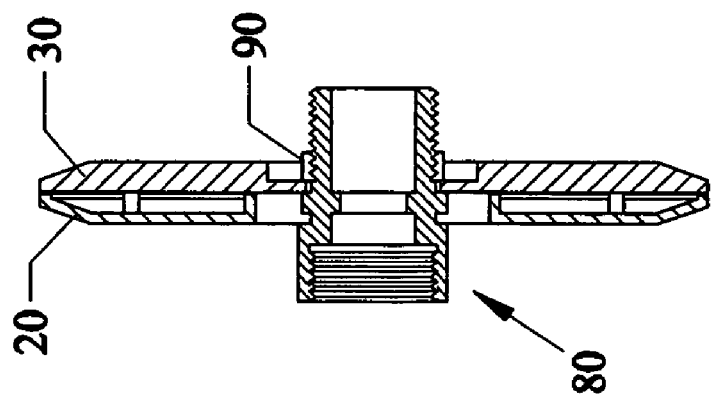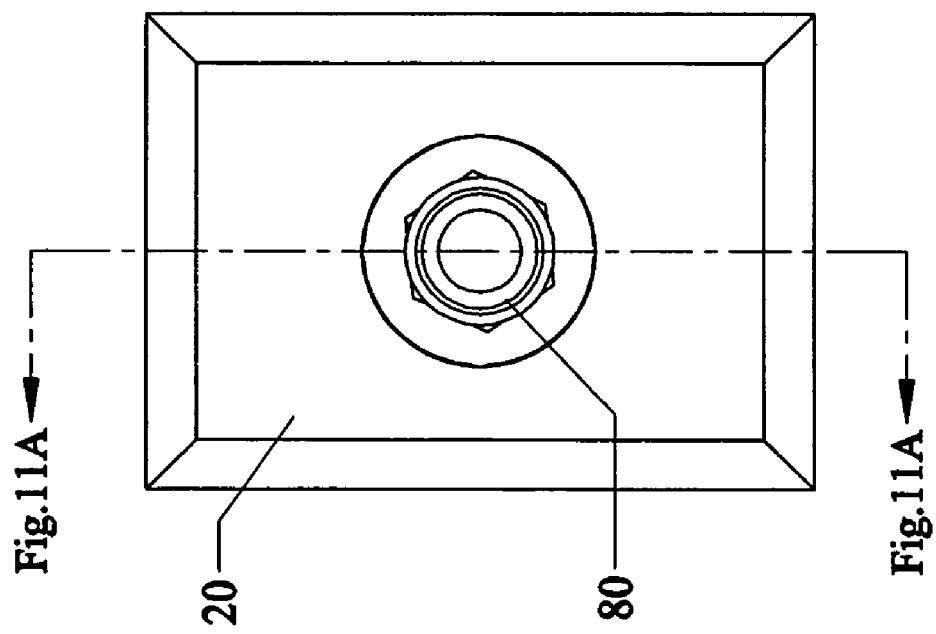

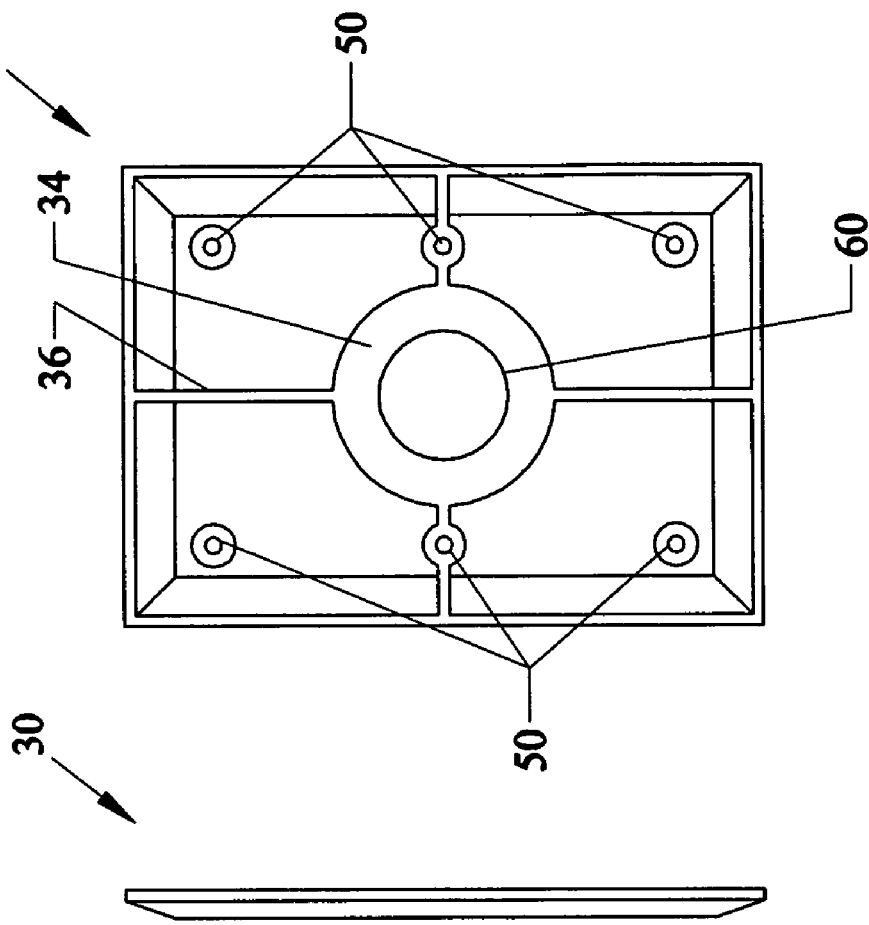

SCREEN CONNECTION PASS-THROUGH FOR HOSES, ELECTRIC/POWER CORDS, TELEPHONE AND CABLE LINES

This invention relates to pass through connection, in particular to devices, apparatus, systems and methods for providing a pass through connection opening for water hoses, electrical and power cords, telephone lines, and cable lines to freely pass through screens such as screen pool enclosures, screen doors, and the like.

BACKGROUND AND PRIOR ART

Screen enclosures for porches and swimming pools are increasingly popular, especially in places such as Florida, as a barrier to undesirable insects such as mosquitoes, and the like, from entering into the enclosure. A problem with the screened enclosures is how to allow power cords and/or water lines to pass from one side of the enclosure to the other, without having to open an exterior door the enclosure, or with enclosure that have no exterior door type openings.

For example, an outdoor water spigot located outside of a pool enclosure that is to be used to supply water to the pool inside the enclosure would require the door to the enclosure be propped open. Propping the door open over any period of time would defeat the purpose of the enclosure which is to keep bugs, and insects from entering the enclosure. Similarly, attaching a power cord to an electric outlet inside of the pool enclosure to power garden tools, such as a weed whacker, and the like, outside of the enclosure may also require the door to enclosure to be propped open.

The problem is further compounded with enclosures where there are no exterior door and/or window type openings. Here, the user may have to punch and/or cut an opening in the screen itself to allow the water line garden hose and/or power cord to pass through. The cut through hole would then allow for undesirable insects to pass through when the garden hose or power cord is removed. Alternatively, the user would have to patch the hole, which would clearly become an undesirable and visible patch job that would detract from the clean appearance of the screen enclosure walls. Still furthermore, the user would have to recut openings in more than one location if the power cord is needed at other locations.

Various types of patents have been proposed over the years. See for example, U.S. Pat. No. 6,634,407 to Strohmeyer; and U.S. Published Patent Application 2005/0001107 to Costas. The Strohmeyer device requires plates on both sides of a screen to have screws 30 to attach the plates to one another. Using a small screw driver to separately screw in four screws can be quite difficult, and the screws can become easily lost. In addition, all the screws must be equally tightened in order to have a uniform seal about all sides of the plates, or there will be air leaks, and the like, that can result in the plates pulling off and further tearing the surrounding screen. Also, metal fasteners such as screws can rust and deteriorate when used outside. Still furthermore, the device has multiple teeth and slots that also must be carefully lined up so that the plates correctly overlap and sandwich the screen therebetween. Still furthermore, this device uses a loose flap members to adjust the opening size that can easily tear and break off over time resulting in a permanent opening or a leaky fit for allowing insects to pass therethrough. Still furthermore, the device uses a loose fitting plug member 24-26 that can also easily become dislodged and fall out which would further result in insects and the like passing through the permanent opening.

The Costas device also has similar problems and additional ones. Costas also requires small loose screws to attach the plate sides together that can be difficult to achieve with small screw drivers, as well as having the problem of the loose screws becoming lost. Costas also requires the plates be attached directly to screen frames, which limits the location of the device to only be mounted to the location of the frame, and not to any location on the screen. Additionally, the screws are located to one side of the plates, and do not allow for all sides of the plates to be uniformly sealed to one another. Also, the mounting to the frame is undesirable, since the screws must create permanent holes in the frame material which can create an electrolysis effect where dissimilar materials can deteriorate the screen cage framing over time. Still furthermore, this device is only for attaching a water hose bib directly to the screen cage, which does not allow for garden hoses and electrical cords to pass through the pass through. Still furthermore, the device allows for no closure for the opening if the bib is not being used, and does not allow for different size hoses or cords to pass through, which cause undesirable permanent openings for insects, and the like.

Thus, the need exists for solutions to the above problems with the prior art.

SUMMARY OF THE INVENTION

A primary objective of the present invention is to provide devices, apparatus, systems and methods for passing water hoses, electrical and power cords, telephone lines, and cable lines through screen walls that does not require the use of loose fasteners such as screws, and the like.

A secondary objective of the present invention is to provide devices, apparatus, systems and methods for passing water hoses, electrical and power cords, telephone lines, and cable lines through screen walls that can be easily mounted to the screen without any tools.

A third objective of the present invention is to provide devices, apparatus, systems and methods for passing water hoses, electrical and power cords, telephone lines, and cable lines through screen walls that can be easily mounted to any location on a screen without much difficulty A fourth objective of the present invention is to provide devices, apparatus, systems and methods for passing water hoses, electrical and power cords, telephone lines, and cable lines through screen walls that can be easily closed off with a plug that does not easily fall out.

A fifth objective of the present invention is to provide devices, apparatus, systems and methods for passing water hoses, electrical and power cords, telephone lines, and cable lines through screen walls that allows for an adjustable and tight fitting between the pass through hose or cord and the opening.

An embodiment of the pass-through apparatus for screens, can include a first plate having a central opening therethrough, with a plurality of male members each with enlarged head portions protruding from one side of the first plate, the first plate being placed against one side of a screen, a second plate having a central opening therethrough, with a plurality of female openings about perimeter edges of the second plate, the second plate being placed on an opposite side of the screen with the screen sandwiched between the first plate and the second plate, and wherein the enlarged head members of each of the plurality of male members is snapably received within each of the plurality of female openings, forming a uniform seal about perimeter edges of the plates to the screen, and an opening in the screen for allowing the central opening of the first plate to be aligned with the central opening of the second plate so that an elongated member passes from one side of the screen through the other.

The elongated member can be a garden hose. The elongated member can be an electrical conduit. The elongated member can be selected from the group consisting of a telephone line and a cable line.

The apparatus can include a through-hole reducing diameter member that can include a grommet positioned in the opening of the screen. The grommet can have a first side ring, a second side ring and a U-shaped groove therebetween. The first side ring and the second side ring for sandwiching about perimeter edges of the opening in the screen, and the elongated member passes through the grommet.

The apparatus can have a connector having first end with a threaded interior cavity walls, and a second end with a threaded exterior surface, and an enlarged mid-portion therebetween, and a nut with a threaded interior, wherein the threaded exterior surface of the second end protrudes through the opening in the screen and is held to the first and the second plates by the nut screwed about the threaded exterior surface of the second end of the connector, and wherein the elongated member passes through the connector, so that hoses are attachable to both ends of the connector. The connector can have a plug with a protruding portion with an exterior threaded surface for mateably being received within the threaded interior cavity walls of the first end of the connector.

The plurality of male members and the plurality of female openings in the apparatus can include solely four male members each about corners of the first plate, solely four female members. each about corners of the second plate.

A method of forming a pass-through connector through a screen can include the steps of providing a screened wall that separates an interior space from an outdoor space, providing a first plate having a central opening, with a plurality of male members each with enlarged head portions protruding from one side of the first plate, providing a second plate having a central opening, with a plurality of female openings about perimeter edges of the second plate, positioning the first plate against one side of a screen so that the male members protrude through the screen, positioning the second plate on an opposite side of the screen from the first plate so that the female openings are aligned with the male members, pushing the male members into the female openings until all of the male members are snapably received within all of the female members, forming an opening in the screen through the central openings of the first plate and the second plate, and passing an elongated member through the opening in the screen so that the elongated member has portions located on both the interior space and the exterior space.

The method can include the step of reducing the diameter of the central openings in the first plate and the second plate with a diameter reducing member, so that a smaller diameter elongated member can be sealingly positioned in the central openings of the first and the second plates.

The method reducing step can include the step of positioning a grommet in the opening of the screen. The step of positioning the grommet can include the step of sandwiching edges of the opening in the screen between first and second rings.

The method reducing step can include the steps of providing a connector having first end with a threaded interior cavity walls, and a second end with a threaded exterior surface, and an enlarged mid-portion therebetween, providing a nut with a threaded interior, positioning the connector so that the threaded exterior surface of the second end protrudes through the opening in the screen, attaching the connector to the first and the second plates by the nut screwed about the threaded exterior surface of the second end of the connector, and passing the smaller diameter elongated member through the connector.

The connector positioning steps can include the steps of providing a plug with a protruding portion having a threaded surface, screwing the protruding portion of the plug into the threaded interior cavity walls of the first end of the connector, and plugging up the central openings in both the first plate and the second plate with the plug.

The steps of providing the plurality of the male members and the step of providing the plurality of the female members can include the steps of providing four male members each about corners of the first plate, providing four female members. each about corners of the second plate, and sealing all the corners of the first plate to all the corners of the second plate only with the four male members and the four female members.

Further objects and advantages of this invention will be apparent from the following detailed description of the presently preferred embodiments which are illustrated schematically in the accompanying drawings.

BRIEF DESCRIPTION OF THE FIGURES

FIG. 1 is a perspective view of the screen plate assembly with grommet attached to a screen with a garden hose passing through the assembly.

FIG. 1A is a partial enlarged view of the garden hose passing through the FIG. 1 assembly.

FIG. 3A is an enlarged view of the electrical cord passing through the FIG. 1 assembly.

FIG. 6 is an exploded right view of the plate assembly components and hose connector.

FIG. 6A is an enlarged view of a male fastener member with enlarged head of FIG. 6.

FIG. 7 is an exploded left view of the plate assembly and hose connector of FIG. 6.

FIG. 8 is a front view of the assembled plate assembly with grommet.

FIG. 8A is a side cross-sectional view of FIG. 8 along arrows 8X.

FIG. 9 is a rear view of the assembled plate assembly with grommet.

FIG. 9A is an upper cross-sectional view of FIG. 8 along arrows 9Y.

FIG. 10 is a side view of the assembled plate assembly with grommet of FIG. 9.

FIG. 11 is a front view of the assembled plate assembly with hose connector.

FIG. 11A is a side cross-sectional view of FIG. 11 along arrows 11X.

FIG. 21 is an outside view of the back plate of the plate assembly.

FIG. 22 is a side view of the back plate of FIG. 21.

FIG. 23 is an inside view of the back plate of FIG. 21.

DESCRIPTION OF THE PREFERRED EMBODIMENTS

Figure 2A:
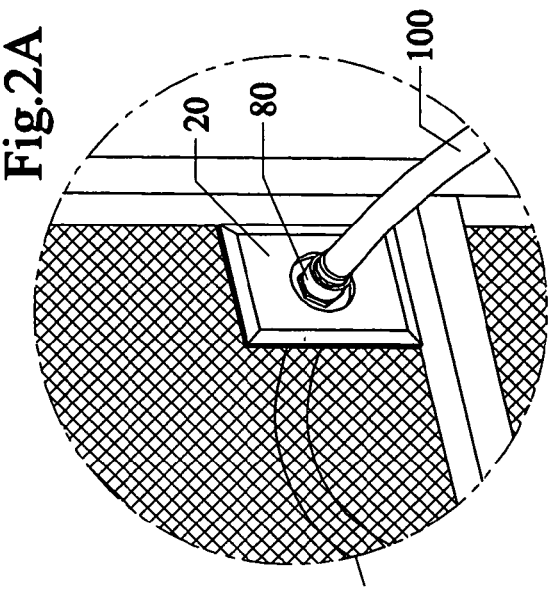
FIG. 2A is a partial enlarged view of the garden hoses attached to the assembly of FIG. 2.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of the terms is now described.
10 Screen Plate Assembly
20 Front Plate
24. inwardly facing cylindrical portion
25. Central opening
26. four cut-out grooves on cylindrical portion
30 Back Plate
34. Inwardly facing raised ring
35. Central opening
36. Four inwardly facing four rib members
38. narrow ring portion
40 Snap Post
50 Snap Receptacle
60 Pass-Thru Hole
70 Rubber/Flexible Grommet
72. first side ring portion
76. U-shape groove
78. second side ring portion
80 Garden Hose Connector
82. Front cylindrical end
83. A threaded socket
85. Enlarged midportion
86. Rear end
87. Exterior threaded surface
90 Hose Connector Nut
100 Garden Hose
110 Electrical Extension Cord
120 Screen
125. Cut-out in screen
130 Electrical Outlet
140 Hose Connector Plug
145. Threaded end of plug FIG. 1 is a perspective view of the screen plate assembly 10 with grommet 70 attached to a screen 120 with a garden hose 100 passing through the assembly 10. FIG. 1A is a partial enlarged view of the garden hose 100 passing through the FIG. 1 assembly 10. The assembly 10 can be located adjacent to a frame section of the screen for support.

Figure 2B:
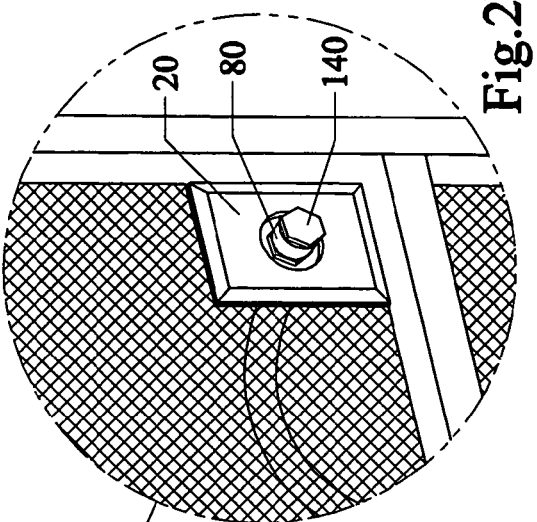
FIG. 2B is another partial enlarged view of FIG. 2A with a plug on the connector.
Figure 2:
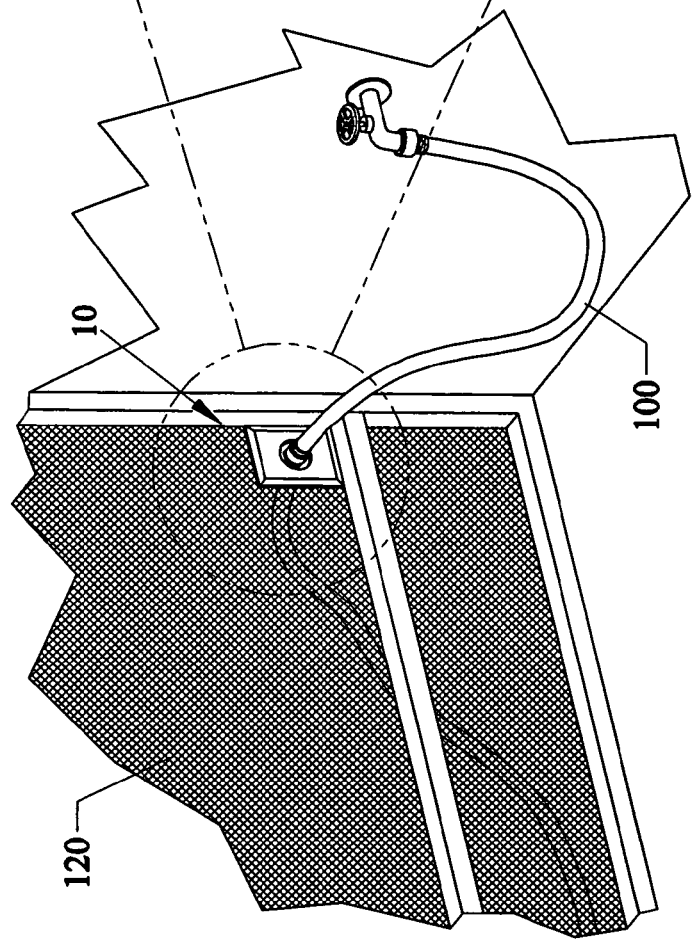
FIG. 2 is a perspective view of the screen plate assembly with hose connector attached to a screen with garden hoses attached to both sides of the hose connector.

FIG. 2 is a perspective view of the screen plate assembly 10 with hose connector 80 attached to a screen 120 with garden hoses 100 attached to both sides of the hose connector 80. FIG. 2A is a partial enlarged view of the garden hoses 100 attached to the assembly 10 of FIG. 2. FIG. 2B is another partial enlarged view of FIG. 2A with a plug 140 on the connector 80. The assembly 10 can be located adjacent to a frame section of the screen for support.

Figure 3:
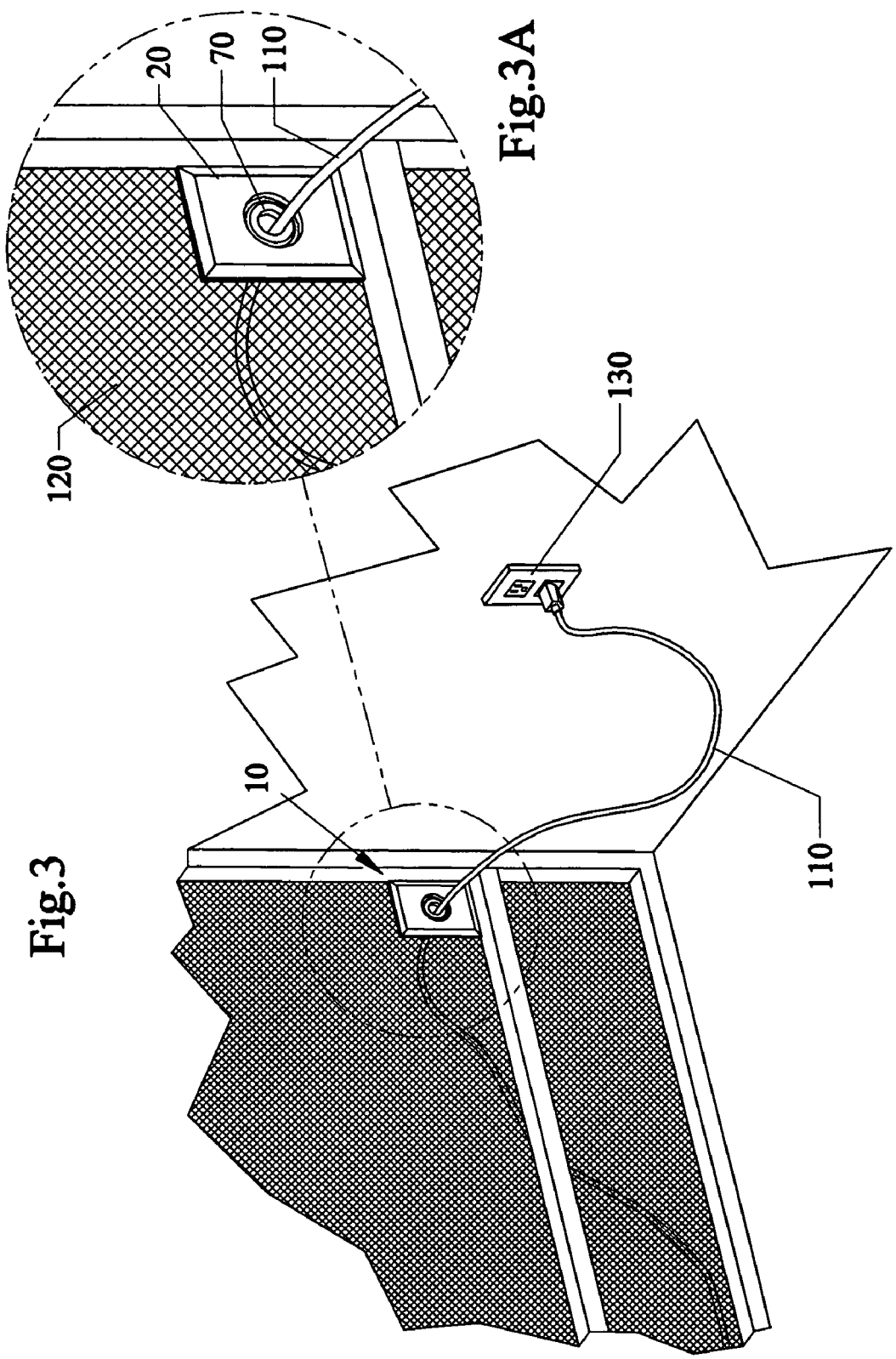
FIG. 3 is a perspective view of the screen plate assembly with grommet attached to a screen with an electrical cord passing through the assembly.

FIG. 3 is a perspective view of the screen plate assembly 10 with grommet 70 attached to a screen 120 with an electrical cord 110 passing through the assembly 10. FIG. 3A is an enlarged view of the electrical cord 110 passing through the assembly 10. The assembly 10 can be located anywhere on the screen either adjacent to or away from the frame enclosure supports for the screen.

Figure 4:
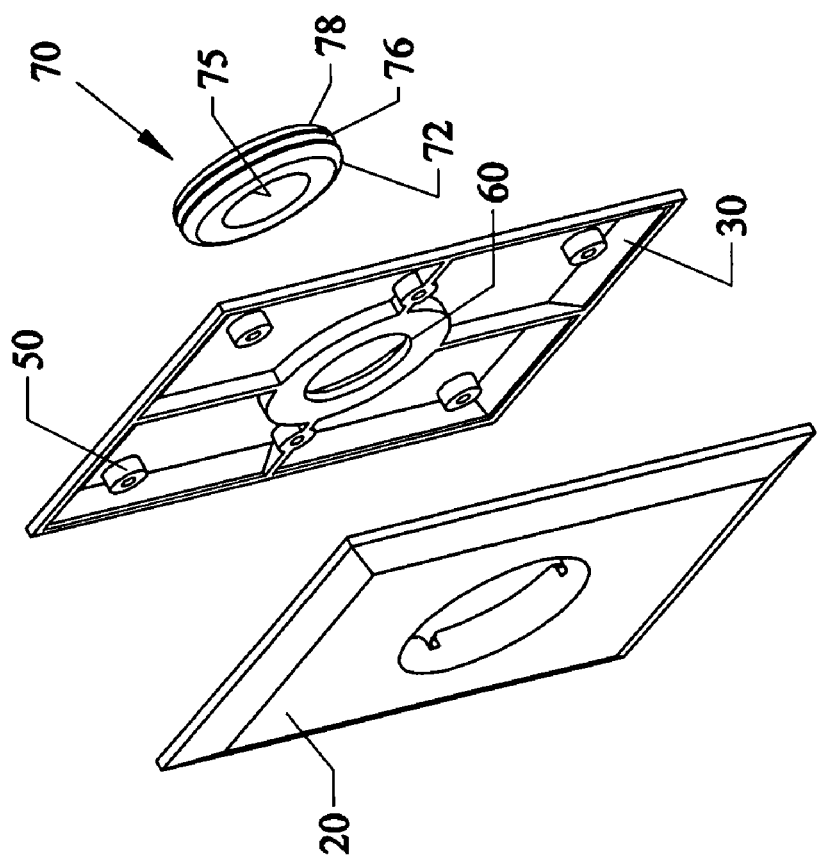
FIG. 4 is an exploded right view of the plate assembly components and grommet.
Figure 5:
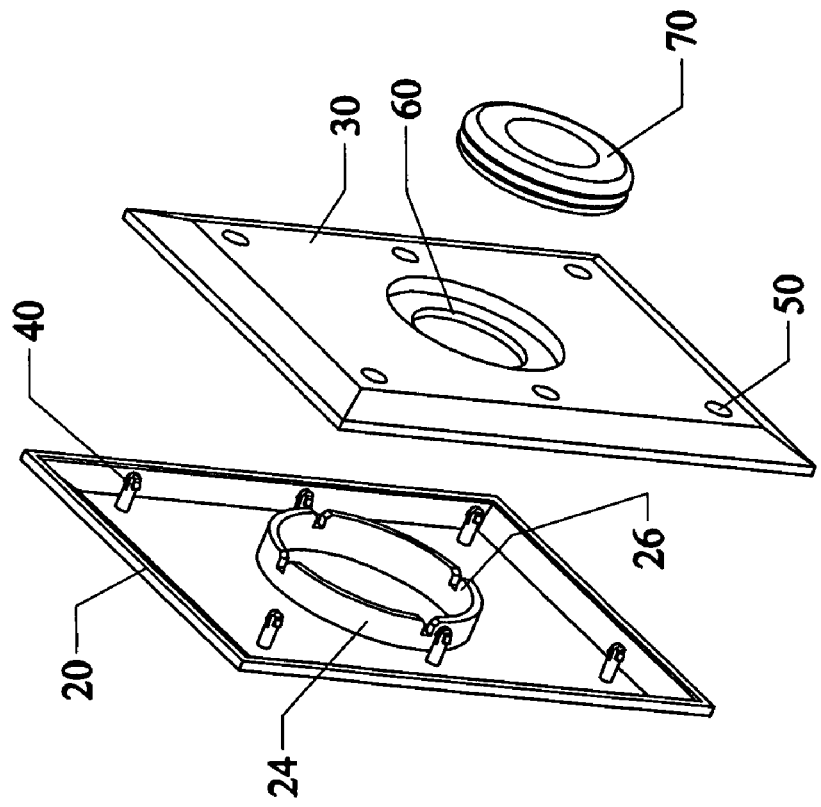
FIG. 5 is an exploded left view of the components and grommet of FIG. 4.

FIG. 4 is an exploded right view of the plate assembly components 20-60 and grommet 70. FIG. 5 is an exploded left view of the components 20-60 and grommet 70 of FIG. 4.

FIG. 6 is an exploded right view of the plate assembly components 20, 30 and hose connector 80, 90, 140. FIG. 6A is an enlarged view of a male fastener member (snap post) 40 with enlarged head 45 of FIG. 6. FIG. 7 is an exploded left view of the plate assembly 20, 30, and hose connector 80, 90 of FIG. 6 with plug 140, and female receptacles 50.

FIG. 8 is a front view of the assembled plate assembly 10 with grommet 70. FIG. 8A is a side cross-sectional view of FIG. 8 along arrows 8X. FIG. 9 is a rear view of the assembled plate assembly 10 with grommet 70. FIG. 9A is a upper cross-sectional view of FIG. 8 along arrows 9Y. FIG. 10 is a side view of the assembled plate assembly 10 with grommet 70 of FIG. 9.

Figure 13:
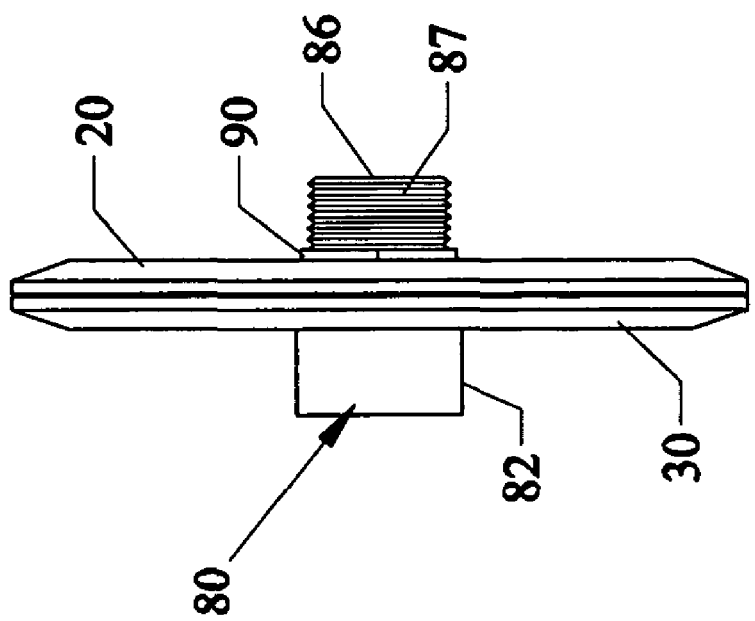
FIG. 13 is a side view of the assembled plate assembly with hose connector of FIG. 12.
Figure 12:
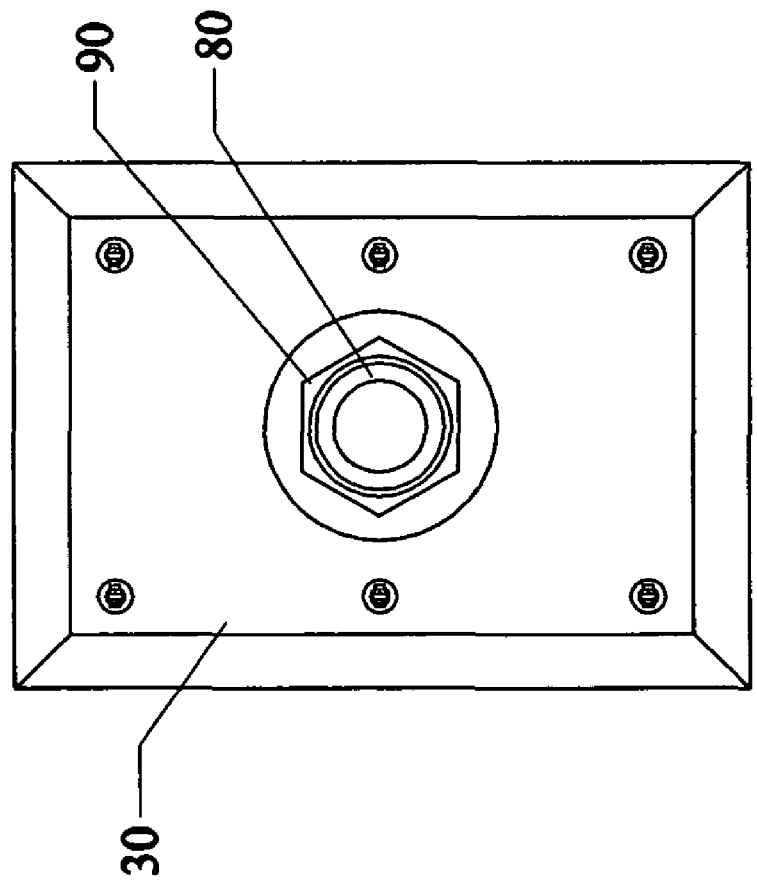
FIG. 12 is a rear view of the assembled plate assembly with hose connector.

FIG. 11 is a front view of the assembled plate assembly 10 with hose connector 80. FIG. 11A is a side cross-sectional view of FIG. 11 along arrows 11X. FIG. 12 is a rear view of the assembled plate assembly 10 with hose connector 80. FIG. 13 is a side view of the assembled plate assembly 10 with hose connector 80 of FIG. 12.

Figure 14:
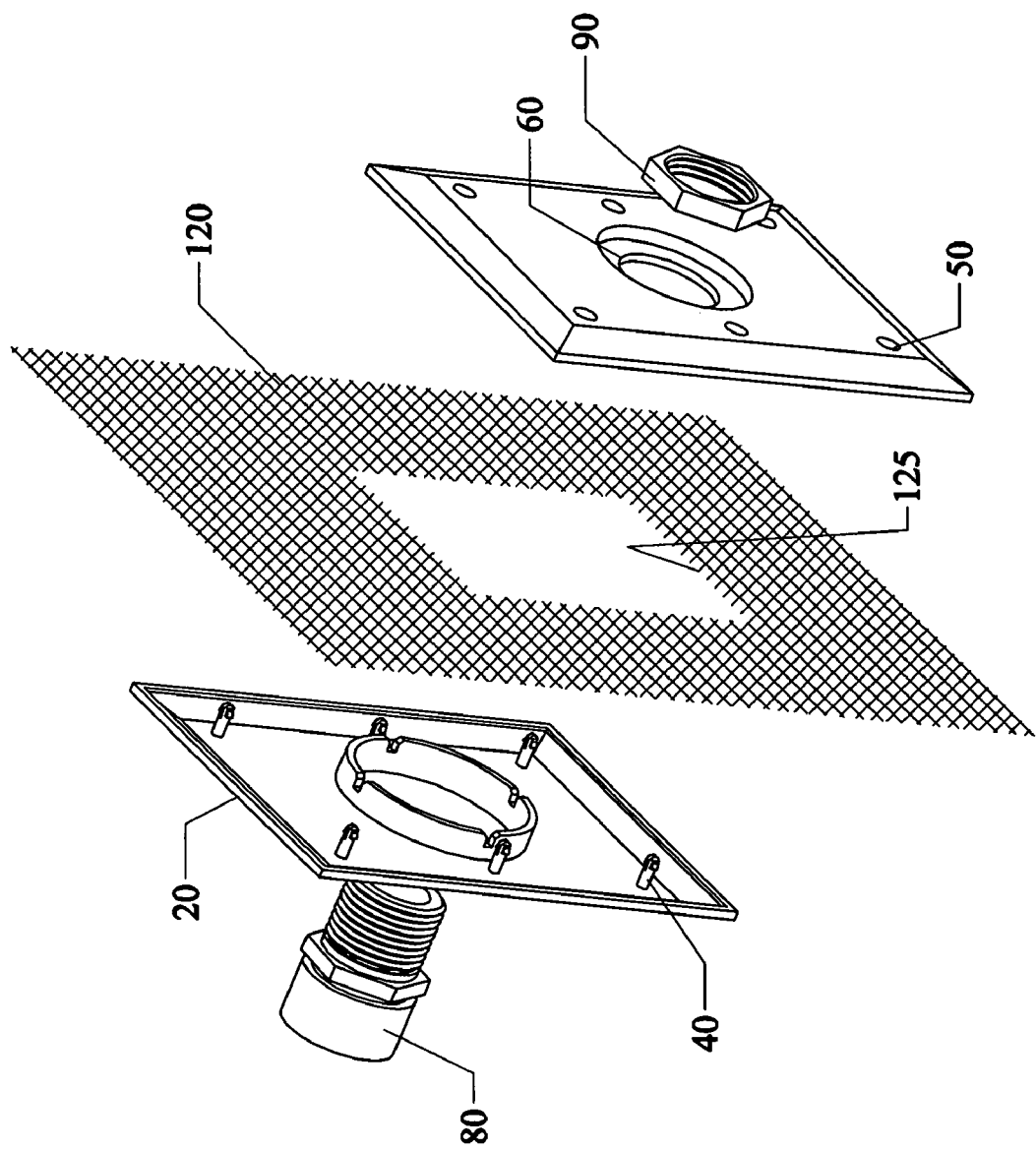
FIG. 14 is an exploded view of plate assembly components, hose connector and screen.
Figure 15:
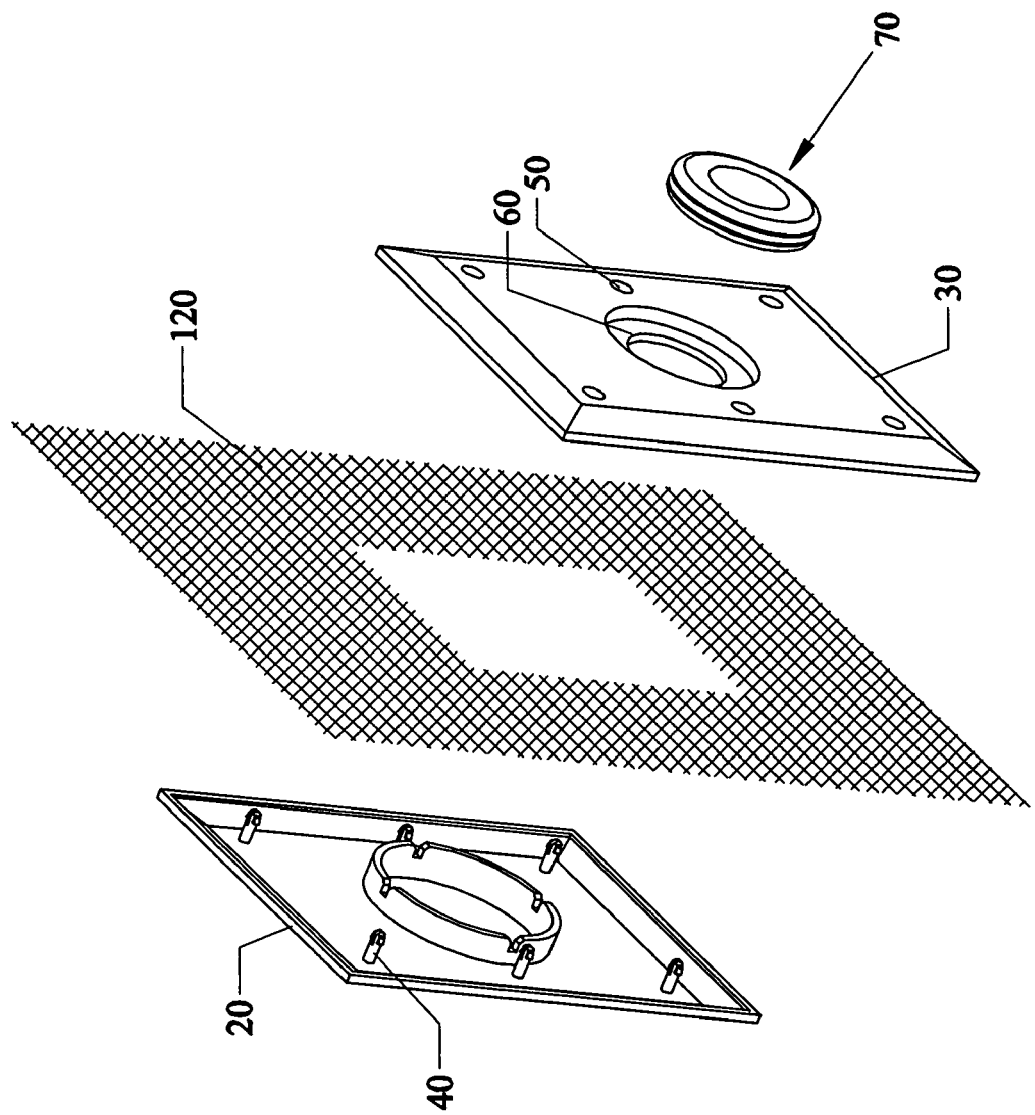
FIG. 15 is an exploded view of the plate assembly components, grommet and screen.

FIG. 14 is an exploded view of plate assembly components 20, 30, hose connector 80 and screen 120. FIG. 15 is an exploded view of the plate assembly components 20, 30, grommet 70 and screen 120.

Figure 18:
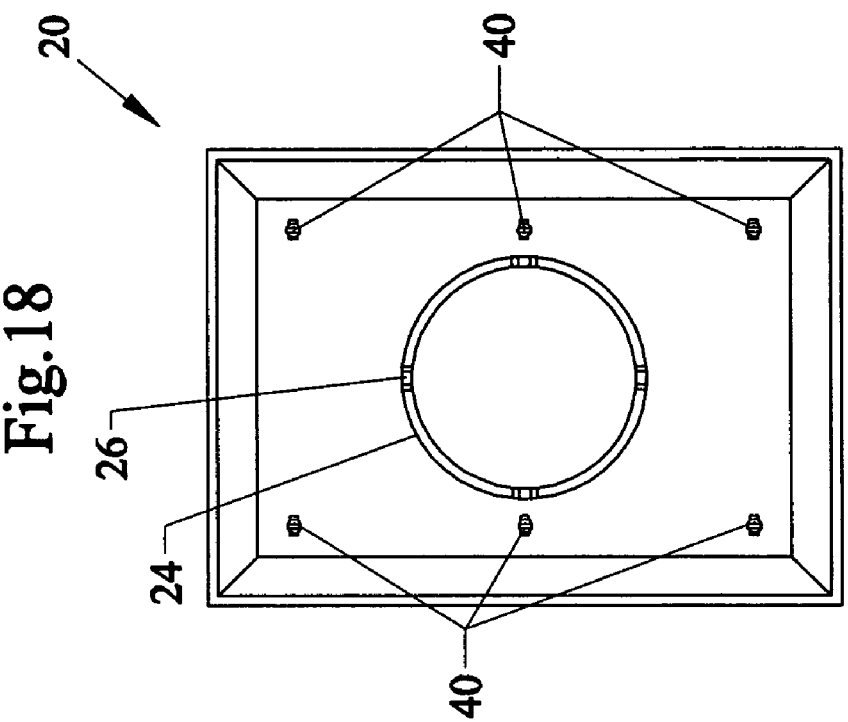
FIG. 18 is a rear view of the front plate of FIG. 16.
Figure 17:
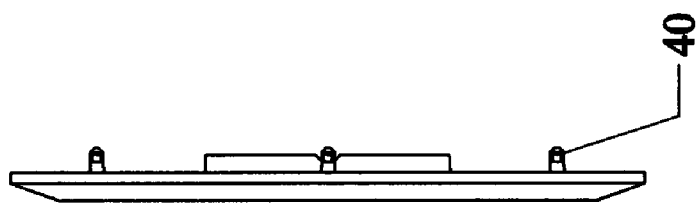
FIG. 17 is a side view of the front plate of FIG. 16.
Figure 16:
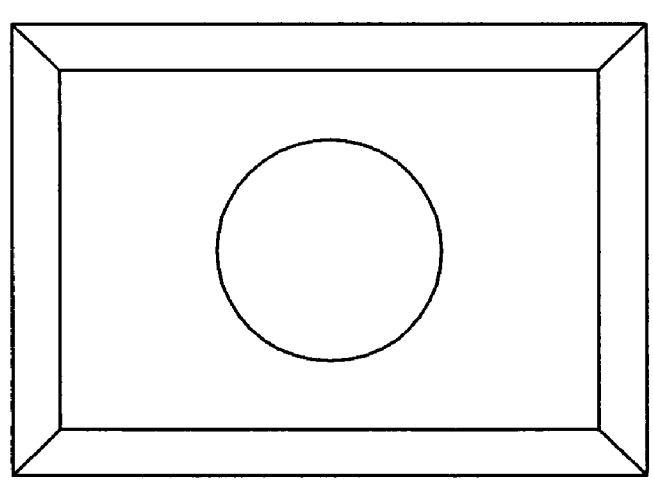
FIG. 16 is a front view of the front plate of the plate assembly components.
Figure 20:
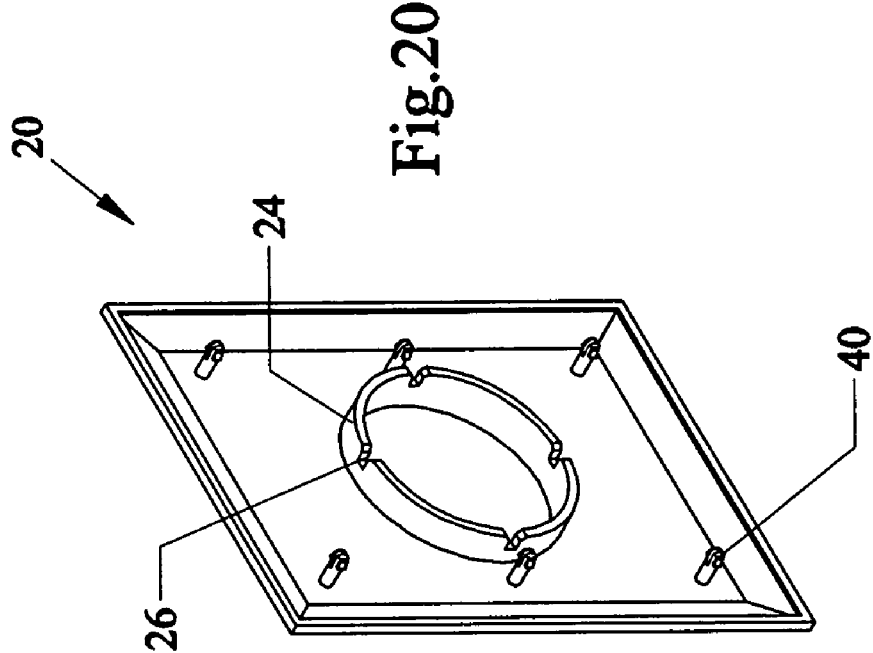
FIG. 20 is a rear perspective view of the front plate of FIG. 18.
Figure 19:
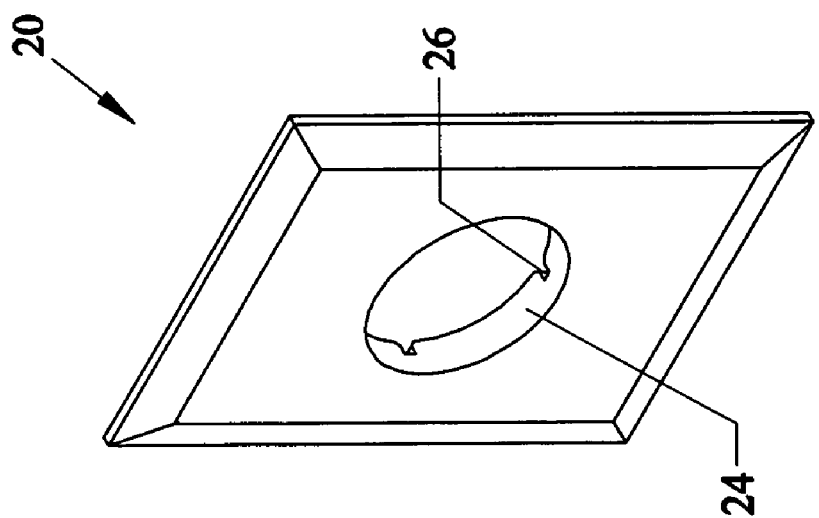
FIG. 19 is a front perspective view of the front plate of FIG. 16.

FIG. 16 is a front view of the front plate 20 of the plate assembly components. FIG. 17 is a side view of the front plate 20 of FIG. 16. FIG. 18 is a rear view of the front plate 20 of FIG. 16. FIG. 19 is a front perspective view of the front plate 20 of FIG. 16. FIG. 20 is a rear perspective view of the front plate 20 of FIG. 18.

Figure 25:
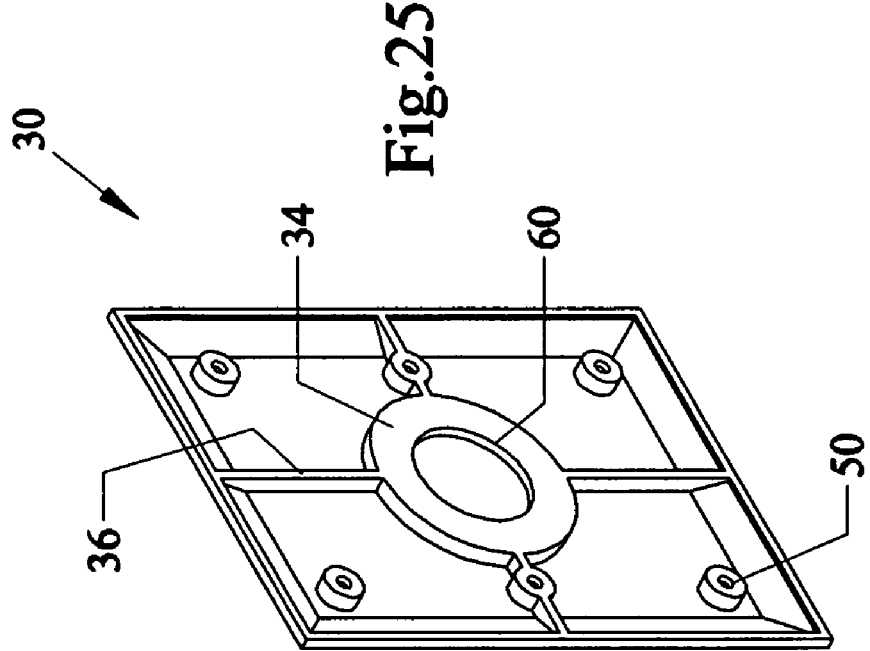
FIG. 25 is a perspective view of the inside of the back plate of FIG. 22.
Figure 24:
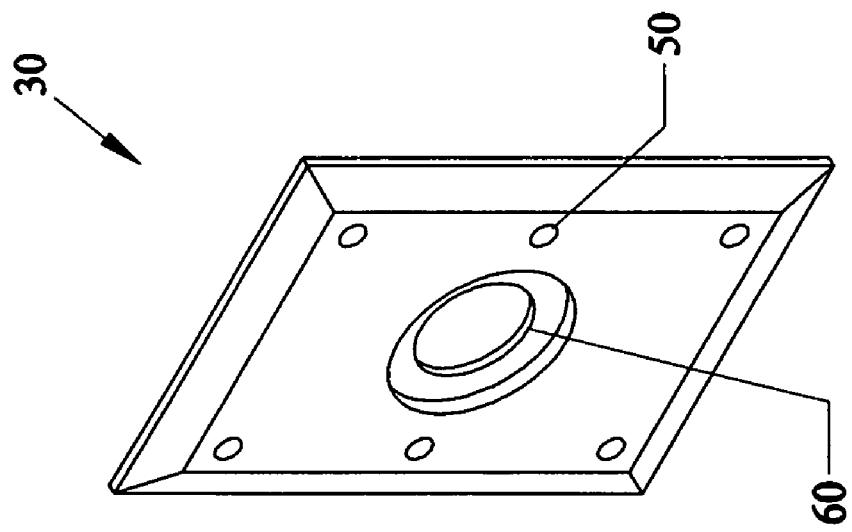
FIG. 24 is a perspective view of the outside of the back plate of FIG. 21.

FIG. 21 is an outside view of the back plate 30 of the plate assembly 10. FIG. 22 is a side view of the back plate 30 of FIG. 21. FIG. 23 is an inside view of the back plate 30 of FIG. 21. FIG. 24 is a perspective view of the outside of the back plate 30 of FIG. 21. FIG. 25 is a perspective view of the inside of the back plate 30 of FIG. 22.

The invention can be applied to screens for allowing elongated members such as water hoses, such as garden hose pass through, and for allowing cord type pass through, such as those associated with electrical and power cords, telephone lines, and cable lines.

Water Hose Pass Through

Referring to FIGS. 1-2B, 6, 7, 11-14, 16-25, the assembly 10 can include a front plate 20 and back plate 30 each being generally rectangular and having perimeter edges that slope down away from a generally flat outer face to a perpendicular rectangular frame. Front face 20 has a central opening 25 that is aligned with the central opening 35 of back plate 30 to form a pass-hole 60 therebetween so that the elongated member100 (here a water hose), can be passed through. Central opening 25 in front plate 20 can be sized to have a larger diameter than central opening 35 in black plate 30. Front plate 20 has a rear face with the central opening 25 formed from an inwardly facing cylindrical portion 24 with approximately four cut-out grooves 26. The cylindrical portion 24 is shaped to wrap about the inwardly facing raised ring edge 34 of central opening 35 of the back plate 30, and the cut-out grooves 26 are able to receive each of the four rib members 36 on the inwardly facing surface of back plate 30.

The front plate 20 can be locked to the back plate 30 by having each of the six enlarged heads 45 of the six snap posts 40 that extend inwardly from the rear of the front plate 10 being inserted into and snapably locking within the six female receptacles 50 on the back plate 30. Each enlarged head 45 can have a generally conical shape with raised angled flanges, each having perpendicular ends that snap out of the exterior surface of the back plate 40 when the heads 45 have passed entirely through the female receptacles 35. Unlike fasteners, such as screws, no tools are needed to secure the front plate 20 to the back plate 30.

For installation, the front plate 20 can be positioned over a portion of the screen 120 where a pass through connection is desired. The invention allows for the plate assemblies 10 to be positioned anywhere on the screen wall 120. The rearwardly facing conical heads 45 of the male posts 40 can be pushed into the section of screen until the heads pass through the screen. Next the face of the back plate 30 with raised ring, 34 and ribs 36 can be aligned up as previously described and pressed against the front plate 20 with cylindrical portion 24 and grooves 26, and pressed together until the male members 40 have snapped together with the female receptacles 50.

Next, the user can cut-out the screen material in the openings 25, 35, so that a clear pass through opening 60 is achieved in the assembled assembly 10. Alternatively, the installer can pre-cur out a small opening 125 such as a rectangular opening (FIG. 14) in the screen 120 that is smaller than the length and width dimensions of the front plate 20 and back plate 30, so that the installer does not need to separately cut-out the portion after assembly.

The assembled plate assembly 10 can be used to run a continuous water hose through the opening 60 by itself. Additionally, the assembled plate assembly can be used with a connector 80 to allow ends of water hoses to be attached to both sides of the assembled plate assembly.

Referring to FIGS. 6, 7 and 11-13, hose connector 80 can have a hollow opening therethrough and includes front cylindrical end 82 with opening forming a threaded socket 83, enlarged midportion 85, rear end 86 with exterior threaded surface 87. The rear end 87 is sized to fit through opening 25 (that can have a hexagon shape) in front plate 20 and opening 35 in back plate 30 so that enlarged midportion 85 abuts against the surface of raised ring 34. A fastening nut 90, such as a hexagon shaped nut, can be attached to and threaded about exterior threaded surface 87 of rear end 86, until the nut abuts against the outside of back plate 30, which results in the connector 80 being locked to the assembled plate assembly 10.

When the connector 80 is not being used, the opening through the connector can be blocked by screwing the threaded end 145 of plug 140 into the threaded socket 83 of front end 82, which effectively seals off the pass through.

Referring to FIGS. 1-2A, a female receptacle end (having threaded socket portion) of a hose 100 can be attached to the rear end 86 of the connector 80 and on the opposite side of the assembled plate assembly 10 a male end (having a threaded exterior surface) can be attached to the front socket end 82 of the connector 80. Thus, the connector 80 can allow for separate hose extensions to be directly attached to the assembled plate assembly 10. Additionally, the plates 20 and 30 can be reversed on opposite sides of the screen wall 120 that the plate assembly 10 is attached thereto.

Electrical Cord/Power Cord/Telephone Line/Cable Pass Through

Referring to FIGS. 3-5, 8-10, 15, 16-25, the plate assembly 10 uses the same front plate 20 and back plate 30, and snap fastener components 40, 50 described above, with the exception of using a grommet 70 for being inserted into the pass through 60. Grommet 70 can a first side ring portion 72, and second side ring portion 78 and U-shape groove 76 therebetween, which can fit about a narrow inner ring portion 38 that protrudes into the opening 60. The grommet 70 can be a semiflexible, formed from an elastomer material, rubber, and the like, which narrows and reduces the diameter of the through hole opening 60 through the assembled plate assembly 10, to allow for a tighter fit of an elongated member 110 to be passed therethrough. Preferably the grommet will allow for a sealingly tight fit for the elongated member and the plate assembly 10.

An example of an elongated member 110 can be an electrical power cord that can have one end mounted to a power outlet 130. Alternatively, the elongated member 110 can be telephone line, cable line, and the like. The plates 20, 30 can be assembled to a screen wall 120 similar to the previous embodiments described.

While six male fastener posts and six female receptacles are described, the invention can be practiced with less than six of each of these fasteners, or more than six as needed. Similarly, the shape of the plates can include other geometrical shapes.

Although the elongated members passing through the plate assemblies are described as electrical cords and hoses, other types of members can pass through the plate assemblies such as but not limited to metal and plastic pipes, conduits, and the like.

Additionally, although the diameter reducing members such as the grommet is described and shown having a circular through-hole, other types of diameter reducing components can be used so that other types of opening shape, such as rectangular, square, hexagon, openings can be formed as the pass-through opening. For example, a flat power cord can be used with the invention as well.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A pass-through apparatus for screens, comprising:
 a first plate having a first central opening therethrough with a first diameter, with a plurality of male members each with enlarged head portions protruding from one side of the first plate, the first plate being placed against one side of a screen;
 a second plate having a second central opening therethrough with a second diameter, with a plurality of female openings about perimeter edges of the second plate, the second plate being placed on an opposite side of the screen with the screen sandwiched between the first plate and the second plate, and wherein the enlarged head members of each of the plurality of male members is snapably received within each of the plurality of female openings, forming a uniform seal about perimeter edges of the plates to the screen;

a protruding narrow width ring portion that protrudes into the first central opening and the second central opening, the narrow width ring portion having a ring opening therethrough with a ring opening diameter, wherein the ring opening diameter having a smaller opening diameter than both the first diameter of the first central opening and the second diameter of the second central opening;

a grommet having a first side ring, a second side ring, and a U-shaped groove between the first side ring and the second side ring, wherein the U-shaped groove fits about a perimeter edge of the protruding narrow width ring portion; and an opening in the screen for allowing the first central opening of the first plate to be aligned with the second central opening of the second plate, wherein the first side ring and the second side ring are sandwiching about perimeter edges of the opening in the screen, so that an elongated member passes from one side of the screen through another other side of the screen.

2. The pass-through apparatus of claim 1, wherein the elongated member includes:
a garden hose.

3. The pass-through apparatus of claim 1, wherein the elongated member includes:
an electrical conduit.

4. The pass-through apparatus of claim 1, wherein the elongated member is selected from the group consisting of a telephone line and a cable line.

5. The pass-through apparatus of claim 1, further comprising:
a connector having first end with a threaded interior cavity walls, and a second end with a threaded exterior surface, and an enlarged mid-portion therebetween; and
a nut with a threaded interior, wherein the threaded exterior surface of the second end protrudes through the opening in the screen and is held to the first and the second plates by the nut screwed about the threaded exterior surface of the second end of the connector, and wherein the elongated member passes through the connector, so that hoses are attachable to both ends of the connector.

6. The pass-through apparatus of claim 5, further comprising:
a plug having a protruding portion with an exterior threaded surface for mateably being received within the threaded interior cavity walls of the first end of the connector.

7. The pass-through apparatus of claim 1, wherein the plurality of male members and the plurality of female openings consist of:
solely four male members each about corners of the first plate; and
solely four female members. each about corners of the second plate.

8. The pass-through apparatus of claim 1, wherein the first plate includes an inwardly extending cylindrical portion with grooves on an end face of the cylindrical portion, the cylindrical portion forming the first central opening, and the second plate includes an inwardly facing raised ring edge which forms the second central opening, and the cylindrical portion of the first plate is shaped to wrap about the inwardly facing raised ring edge of the second plate.

9. The pass-through apparatus of claim 8, wherein the second plate includes a cross pattern of inwardly facing strengthening ribs, and the cut out grooves on the first plate receive portions of the strengthening ribs.

10. A method of forming a pass-through connector through a screen, comprising the steps of:
providing a screened wall that separates an interior space from an outdoor space;
providing a first plate having a first central opening having a first diameter, with a plurality of male members each with enlarged head portions protruding from one side of the first plate;
providing a second plate having a second central opening having a second diameter, with a plurality of female openings about perimeter edges of the second plate;
providing a protruding narrow width ring portion that protrudes into the first central opening and the second central opening, the narrow width ring portion having a ring opening therethrough with a ring opening diameter, the ring opening diameter having a smaller diameter than both the first diameter of the first central opening and the second diameter of the second central opening;
providing a grommet having a first side ring, a second side ring, and a U-shaped groove between the first side ring and the second side ring;
positioning the first plate against one side of a screen so that the male members protrude through the screen;
positioning the second plate on an opposite side of the screen from the first plate so that the female openings are aligned with the male members;
pushing the male members into the female openings until all of the male members are snapably received within all of the female members;
forming an opening in the screen through the central openings of the first plate and the second plate;
sandwiching perimeter edges of the opening in the screen with the first side ring and the second side ring of the grommet;
fitting the U-shaped groove of the grommet about a perimeter edge of the protruding narrow width ring portion that protrudes into the first central opening and the second central opening, and
passing an elongated member through the opening in the screen so that the elongated member has portions located on both the interior space and the exterior space.

11. The method of claim 10, further comprising the step of:
reducing the diameter of the central openings in the first plate and the second plate with a diameter reducing member, so that a smaller diameter elongated member can be sealingly positioned in the central openings of the first and the second plates.

12. The method of claim 11, wherein the step of reducing the diameter includes the step of:
providing a connector having first end with a threaded interior cavity walls, and a second end with a threaded exterior surface, and an enlarged mid-portion therebetween;
providing a nut with a threaded interior;
positioning the connector so that the threaded exterior surface of the second end protrudes through the opening in the screen; and
attaching the connector to the first and the second plates by the nut screwed about the threaded exterior surface of the second end of the connector; and
passing the smaller diameter elongated member through the connector.

13. The method of claim 11, wherein the smaller diameter elongated member is an electrical cord.

14. The method of claim 11, wherein the smaller diameter elongated member is a hose.

15. The method of claim 11, wherein the smaller diameter elongated member is selected from the group consisting of a telephone line and a cable line.

16. The method of claim 11, further comprising the steps of:
providing the first plate with an inwardly extending cylindrical portion having grooves on an end face of the cylindrical portion;
providing the second plate with an inwardly facing raised ring edge; and
wrapping the cylindrical portion of the first plate about the inwardly facing raised ring edge of the second plate.

17. The method of claim 16, further comprising the steps of:
providing the second plate with a cross pattern of inwardly facing strengthening ribs; and
receiving portions of the strengthening ribs on the second plate within the cut out grooves on the first plate.

18. The pass-through apparatus of claim 10, further comprising the steps of:
providing a plug with a protruding portion having a threaded surface; and
screwing the protruding portion of the plug into the threaded interior cavity walls of the first end of the connector; and
plugging up the central openings in both the first plate and the second plate with the plug.

19. The method of claim 10, wherein the steps of providing the providing the plurality of the male members and the step of providing the plurality of the female members include the steps of:
solely providing four male members each about corners of the first plate;
solely providing four female members. each about corners of the second plate; and
sealing all the corners of the first plate to all the corners of the second plate only with the four male members and the four female members.

20. A pass-through apparatus for screens, comprising:
a first plate having a first central opening therethrough with a first diameter, with a plurality of male members protruding from one side of the first plate, the first plate being placed against one side of a screen;
a second plate having a second central opening therethrough with a second diameter, with a plurality of female openings about perimeter edges of the second plate, the second plate being placed on an opposite side of the screen with the screen sandwiched between the first plate and the second plate, and wherein the plurality of male members is attached within each of the plurality of female openings, forming a seal about perimeter edges of the plates to the screen;
a protruding narrow width ring portion that protrudes into the first central opening and the second central opening, the narrow width ring portion having a ring opening therethrough with a ring opening diameter, wherein the ring opening diameter having a smaller opening diameter than both the first diameter of the first central opening and the second diameter of the second central opening;
a grommet having a first side ring, a second side ring, and a U-shaped groove between the first side ring and the second side ring, wherein the U-shaped groove fits about a perimeter edge of the protruding narrow width ring portion;
an opening in the screen for allowing the first central opening of the first plate to be aligned with the second central opening of the second plate, wherein the first side ring and the second side ring are sandwiching about perimeter edges of the opening in the screen, so that an elongated member passes from one side of the screen through another other side of the screen;
an inwardly extending cylindrical portion on the first plate with grooves on an end face of the cylindrical portion, the cylindrical portion forming the first central opening;
an inwardly facing raised ring edge on the second plate which forms the second central opening, and the cylindrical portion of the first plate is shaped to wrap about the inwardly facing raised ring edge of the second plate; and
a cross pattern of inwardly facing strengthening ribs on the second plate, wherein the cut out grooves on the first plate receive portions of the strengthening ribs.

* * * * *